(12) United States Patent
Greven et al.

(10) Patent No.: US 8,108,521 B2
(45) Date of Patent: Jan. 31, 2012

(54) METHODS AND SYSTEMS FOR DYNAMIC PARALLEL PROCESSING

(75) Inventors: Boris Greven, Weinheim (DE); Frank Westendorf, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 1486 days.

(21) Appl. No.: 11/346,306

(22) Filed: Feb. 3, 2006

(65) Prior Publication Data

US 2006/0195336 A1 Aug. 31, 2006

(30) Foreign Application Priority Data

Feb. 4, 2005 (EP) .................................... 05002447
Apr. 11, 2005 (EP) .................................... 05007882

(51) Int. Cl.
*G06F 15/173* (2006.01)
*G06F 15/16* (2006.01)

(52) U.S. Cl. ......... 709/226; 709/225; 709/229; 709/246
(58) Field of Classification Search .................. 709/225, 709/229, 246
See application file for complete search history.

(56) References Cited

U.S. PATENT DOCUMENTS

| | | | | |
|---|---|---|---|---|
| 5,920,702 A * | 7/1999 | Bleidt et al. | ................. | 709/231 |
| 6,298,382 B1 * | 10/2001 | Doi et al. | ................. | 709/229 |
| 6,901,446 B2 * | 5/2005 | Chellis et al. | ................. | 709/226 |
| 6,917,947 B2 * | 7/2005 | Jameson | ................. | 1/1 |
| 6,983,322 B1 * | 1/2006 | Tripp et al. | ................. | 709/225 |
| 7,031,989 B2 * | 4/2006 | Elmendorf et al. | ................. | 1/1 |
| 7,272,613 B2 * | 9/2007 | Sim et al. | ................. | 1/1 |
| 7,660,897 B2 * | 2/2010 | Hall et al. | ................. | 709/226 |
| 2002/0147815 A1 * | 10/2002 | Tormasov et al. | ............ | 709/226 |
| 2003/0008712 A1 * | 1/2003 | Poulin | ................. | 463/42 |
| 2004/0088424 A1 * | 5/2004 | Park et al. | ................. | 709/229 |
| 2004/0236869 A1 * | 11/2004 | Moon | ................. | 709/246 |

OTHER PUBLICATIONS

European Search Report, dated Oct. 28, 2005, for European Application No. EP 05 00 7882 (3 pages).

(Continued)

*Primary Examiner* — Emmanuel L Moise
*Assistant Examiner* — Farzana Huq
(74) *Attorney, Agent, or Firm* — Finnegan, Henderson, Farabow, Garrett & Dunner LLP (57) ABSTRACT

Systems and methods are disclosed for dynamic parallel processing of a plurality of subprocesses of a process initiated by a parallel processing framework. The plurality of subprocesses may include processing of one or more data objects in a computer system including a plurality of servers for processing the plurality of data objects by the plurality of subprocesses. The method may include building work packages from the plurality of data objects according to a process-specific scheme, and dynamically distributing the work packages of the plurality of data objects among the plurality of servers according to a process-specific execution order.

24 Claims, 4 Drawing Sheets

OTHER PUBLICATIONS

W. Leinberger, et al., "Multi-Capacity Bin Packing Algorithms with Applications to Job Scheduling under Multiple Constraints," Technical Report 99-24, May 27, 1999, pp. 1-23, Department of Computer Science and Engineering, University of Minnesota.

K. Maruyama, et al., "A General Packing Algorithm for Multidimensional Resource Requirements," *International Journal of Computer and Information Sciences*, Plenum Publishing Corporation, Jun. 1977, pp. 131-149, vol. 6, No. 2.

E. G. Coffman, Jr., et al., "Approximation Algorithms for Bin Packing: A Survey," *Approximation Algorithms for NP-Hard Problems*, 1996, PWS Publishing, Boston, Massachusetts, pp. 1-53.

J. Csirik, et al., "On-Line Packing and Covering Problems," pp. 147-195.

G. Aggarwal, et al., "The Load Rebalancing Problem," SPAA'03, San Diego, California, Jun. 7-9, 2003, pp. 258-265.

J. Vaughan, "Incorporating Job Sizes in Distributed Load Balancing," *Microprocessing and Microprogramming*, 1995, pp. 111-119, vol. 41, Elsevier Science Publishers.

G. Galambos, et al., "Repacking Helps in Bounded Space On-Line Bin-Packing," *Computing*, 1993, pp. 329-338, vol. 49, No. 4, Springer Verlag, Vienna, AT.

* cited by examiner

METHODS AND SYSTEMS FOR DYNAMIC PARALLEL PROCESSING

TECHNICAL FIELD

The present invention relates generally to the field of parallel processing on the basis of a plurality of data objects included by a process. More particularly, and without limitation, the invention relates to computerized systems, methods, and frameworks for parallel processing of a plurality of subprocesses of a process. The subprocesses may be executed, for example, to process one or more data objects. The invention further relates to computer program products and computer-readable media with program code suitable for carrying out methods for parallel processing when executed on a computer.

BACKGROUND INFORMATION

As the speed and processing power of computers has risen, so too has the complexity of software applications that are executed by computers. Software applications may include processes that perform specific tasks. The term "process" broadly refers to any process operating on any type of data object, for example, booking (process) on an account (data object), payment (process) in a commission agreement (data object), and the like. These processes may be time critical, such that the processes have to be processed in a narrow time range. For example, commission payments, such as remuneration payments to employees or agents, may have defined time ranges to execute for a compensation plan.

Systems may parallelize processes manually by using tools to configure the processes that are to be run in parallel. However, the dispatching for every subprocess must be done manually. Several transactions may be executed using a parallelized process in systems which use the client/server technology and provide an ability to store, retrieve, analyze, and process corporate data for financial analysis, production operation, human source management, and most other business processes. For example, a parallelized process may include the definition of a job, simple job choice, and extended job choice. When generating a job, several parameters or factors may be fixed, such as the temporal starting conditions and periodicity, and the priority. Further, the processing goal for a special job can be stated, and a spool list and a spool receiver can be generated. Several steps of a job can be influenced. Jobs may be generated using a wizard and a user interface.

However, current systems for parallelizing processes cannot influence individual parameters or process-specific parameters. Jobs cannot be chosen specifically by process. Furthermore, load distribution cannot be done dynamically among several servers, but has to be explicitly stated statically for each job. Job definition can only be done manually for each job with the help of variants. Furthermore, the time needed to execute jobs is neither optimized nor minimized.

Another technology for the parallelization of processes is a so-called grid technology. The grid technology describes how resources are switched on and off depending on the system load. The grid technology represents a balancing of resources depending on a system load.

In view of the foregoing, improved systems and methods are needed that can parallelize a process by parallel processing a plurality of subprocesses of that process. Further, it would be desirable to provide a system and method that could perform the parallel processing of the subprocesses in a flexible manner, using available resources in an optimal way. Moreover, it would be advantageous to provide the possibility of dynamically distributing a workload among a plurality of servers within a system.

SUMMARY OF THE INVENTION

Consistent with an embodiment of the present invention, a computer-implemented method is provided for dynamic parallel processing of a plurality of subprocesses of a process initiated by a parallel processing framework, each of the plurality of subprocesses including processing of one or more data objects in a computer system. The computer system may include a plurality of servers for processing the plurality of data objects by the plurality of subprocesses. The method may include building work packages from the plurality of data objects according to a process-specific scheme and dynamically distributing the work packages among the plurality of servers according to a process-specific execution order.

Consistent with another embodiment of the invention, a computer system is provided for dynamic parallel processing of a plurality of subprocesses of a process, each of the plurality of subprocesses including processing of one or more data objects. The computer system may include a computing unit providing a parallel processing framework, and a plurality of servers for processing the plurality of data objects by the plurality of subprocesses. Further, the computer system may include an adapter unit for interconnecting the computing unit and the plurality of servers. The adapter unit may be arranged and constructed to automatically build, according to predefined rules, work packages of the plurality of data objects, and to dynamically distribute the work packages of the plurality of data objects among the plurality of servers according to a process-specific execution order.

In accordance with another embodiment of the present invention, a computer readable medium is provided, the computer readable medium including program code instructions which, when executed by a processor, perform a method for dynamic parallel processing of a plurality of subprocesses of a process initiated by a parallel processing framework, each of the plurality of subprocesses including processing of one or more data objects in a computer system comprising a plurality of servers for processing the plurality of data objects by the plurality of subprocesses. The method may include building work packages from the plurality of data objects according to a process-specific scheme and dynamically distributing the work packages among the plurality of servers according to a process-specific execution order.

The parallelization may be implemented, for example, by generating work packages of data objects and sending them to the servers in order to be operated by a specific process. A process can thus be split up into a plurality of subprocesses.

Accordingly, an embodiment of the invention provides a method for dynamic parallel processing of a plurality of subprocesses of a process initiated by a parallel processing framework. The plurality of subprocesses may include processing of one or more data objects in a computer system, and the computer system may include a plurality of servers. The servers may include at least one processor for processing the plurality of data objects by the plurality of subprocesses. The method may comprise building work packages from the plurality of data objects according to a process-specific scheme and dynamically distributing the work packages of the plurality of data objects among the plurality of servers according to a process-specific execution order. The scheme may be defined by means of a framework, such that the work packages can be executed in a semantically arbitrary order. Furthermore, the execution order may be defined by means of the framework.

In one embodiment of the invention, the scheme may be established for building the work packages by putting data objects which share certain predefined items or certain predefined properties in the same work package. The process to be parallelized can be, for example, an accounting of commission contracts of a number of customers. In this case, a contract may correspond to a data object. There could be thousands of such data objects. A possible rule given by the user by means of the framework for building work packages could be to assign all contracts of a certain customer to one and the same work package. Since the customers may have a different number of contracts, the work packages may have different sizes.

The data objects of the work package being processed can be blocked during processing of a work package. Moreover, a whole branch of data objects with same properties can be blocked when one of those data objects is about to be processed. As an example, while executing a single commission contract of a certain customer, all contracts of this certain customer may be blocked for any parallel execution. As a result, if one data object is already being processed by a first server, all further data objects belonging to the same branch of data objects may be blocked. Therefore, these data objects that are blocked cannot be processed by any other server. Accordingly, a second server which intends to do the processing on one of these data objects may have to wait until the blocking ceases, resulting in a waste of computing time. Therefore, in one embodiment consistent with the invention, it may be advantageous to perform a segmentation of the workload on the level where a blocking occurs. For example, the accounting of commission contracts may create a blocking rule within the data system which states that every data object of a certain customer may be blocked while a single data object of this customer is handled. As a result, the building of the work packages may be effected with respect to the identity of the customers. With such a building rule, it may be impossible that, while a specific server computes the work package regarding customer A, any other work package processed by any other server contains data objects relating to customer A.

Methods consistent with the present invention may be performed by a computer system comprising a computing unit which may be directly accessed by any client, and an adapter unit interconnecting the computing unit and the plurality of servers. In addition, each server may contain a certain number of processors, i.e., CPUs. The computing unit can be arranged to put the parallel processing framework at the user's disposal in which the user defines a process-specific scheme. The adapter unit may automatically build work packages of the plurality of data objects using the process-specific scheme. The work packages may be built such that they can be executed in a semantically arbitrary order.

Furthermore, the parallel processing framework may enable the user to define a process-specific order according to which the work packages of the plurality of data objects may be distributed dynamically among the plurality of servers. The framework can contain specialized services and tools, which may reduce the knowledge the user needs to start a specific process. The framework may include the details required to start and control a process. In one embodiment of the invention, the framework may represent a template containing a sequenced set of all segments which relate to a functional business area or to a multi-functional business area and applying to all processes defined for that area or areas.

Furthermore, the framework can allow its functionality to be extended by writing plug-in modules, so-called framework extensions, or functional modules. Thus, the framework may provide a structured collection of software building blocks that can be used to develop components, assemble the components into a specific process, and run the process.

Additionally, in one embodiment consistent with the invention, a user friendly environment may be provided which shows, for example, a graphical representation of the partition of the workload in work packages and the distribution of those work packages among the plurality of servers on display. The representations may be displayed at any time during processing.

In a further embodiment of the invention, the execution order of the work packages may be arranged to minimize the time that a processor is idle until the plurality of servers have completed the workload. The size of a work package may be calculated and adjusted. In order to calculate the size of a work package, the adapter unit may combine a number of data objects in a block.

A number of blocks may form a work package. The number of blocks multiplied with the size of each block may give the size of the work package. The workload may be estimated by multiplying the sum of the work packages with the average size of a work package. With this estimation of the total workload, the amount of time left until the end of the execution may be calculated during execution. Moreover, the computed work packages may be tracked. Comparing the number of already computed work packages with the total workload may enable a user to determine the remaining processing time. If the work packages are sized differently, the work packages can be distributed among the servers in such an execution order that the overall workload to be executed by each server is approximately balanced.

While the above-mentioned grid technology may represent a balancing of resources depending on the system load, methods consistent with the present invention may consider the available resources at present. Such methods may not switch additional resources on or off, but rather use the current activated capacity within the system in an optimal way.

One difference to manual parallelization is the dynamic aspect of methods of the present invention. This dynamic aspect allows automatic control by the adapter unit of sub-processes to be run on different servers. The several work packages built by the adapter unit may be distributed among the presently available servers. As soon as one server finishes a work package, a successive work package can be started immediately. Therefore, the complete workload, segmented in the plurality of work packages, may be distributed dynamically to several sub-processes in ordered work packages. The ordering of the work packages can be done according to a process-specific execution order predefined by the user by means of the framework. A further optimization may be provided using individual adaptation of processes and using the execution order of the work packages Consistent with embodiments of the invention, an improved utilization of available system resources and servers can be realized. An additional acceleration of processes can be reached using process-specific execution of work packages, and the processing time of the server with the largest processing time can be minimized. With the help of methods consistent with the present invention, it is possible to process time critical processes during a time of low user load within a system with minimal process time. For example, processes which have to be done very quickly may be handled in times of low use of the system capacity, such as at night.

Therefore, those processes can be accelerated and handled before system load arises again.

In the above-mentioned example of accounting commission contracts, the entirety of all contracts may represent the workload. The work packages can be built such that each work package comprises all contracts referring to a certain customer. In order to minimize the running time of the whole process, work packages may be arranged according to size in a list, thus defining a process-specific execution order. The work packages may be distributed among the plurality of servers by sending the largest work packages to the available servers first. As soon as one server has finished a work package, the following work package in the list may be sent to that server. In this manner all work packages may be processed step-by-step. The whole process can be shown on a display provided by the parallel processing framework running on the computing unit. In this manner, a user can count and check which work packages are already done, which work packages are currently processed on the servers, and which work packages have still to be sent to the servers. In addition, the user can estimate the remaining running time of the process.

In another embodiment of the invention, a user may determine as a rule for the ordering of the work packages that the work package comprising the contracts relating to a certain customer are chronologically processed with respect to the different customers. The user can feed such a hierarchical execution order into the parallel processing framework. Then, the adapter unit may order the work packages according to this rule. A user may try different execution orders to optimize processing time.

The work packages may be firstly distributed among the servers such that each available server firstly executes one work package. The work packages can be distributed among the servers of the server group until no further resources being available. As soon as one background process returns, for example, in form of a COMMIT, the next work package can be sent to the server. COMMIT control is a function that ensures data integrity.

COMMIT control allows to process blocks in a work package such that no information is lost due to, for example, a restart of the whole process or a restart of a single server. COMMIT control can keep track of a work package from the time of being sent to a server until such time as the work package is processed and returned back from the server. If anything happens during the processing of this work package resulting in a failure, COMMIT control may identify the erroneous work package and react accordingly. For example, the relevant work package may be resent to the server. The block processing may prevent an overflow of internal tables and allow each work package to perform such information via a required COMMIT on the respective server. Therefore, a COMMIT control can prevent such an overflow.

According to a further embodiment, each work package may be processed on a server via an asynchronous remote function call (aRFC). The number of parallel running subprocesses may depend on the configuration and the current load of the system. Normally, this number can be significantly higher than the number of parallel jobs which have been distributed manually. If one job is started, processes (aRFCs) can be started, for example, up to the system limit.

The number of computed data objects may depend on the granularity of the parallelized process. While building the work packages, the adapter unit may choose the size of the work packages according to a predefined granularity, such that during run time all available processors are executing at least one work package, if procurable. Thereby, the processing time can be minimized.

In yet a further embodiment of the present invention, the user may define, during system implementation, a number of functional modules with respect to specific processes. This can be done within the parallel processing framework. If the specific process is activated, the respective functional module may be executed automatically by the adapter unit. Such a functional module may consist of building/ordering rules used by the parallel processing framework for the building/ordering of the work packages. Those functional modules may be called by aRFCs, and the workload may involve an arbitrary number of these functional modules.

Embodiments of the present invention further relate to computer systems for dynamic parallel processing of a plurality of subprocesses of a process, each of the plurality of subprocesses including processing of one or more data objects. The computer systems may include a computing unit and a plurality of servers for processing the plurality of data objects by the plurality of subprocesses. The computing unit may provide a parallel processing framework. Furthermore, the computer systems may include an adapter unit interconnecting the computing unit and the plurality of servers, the adapter unit being arranged and constructed to automatically build, according to rules predefinable by means of the parallel processing framework, work packages of the plurality of data objects such that the work packages can be executed in a semantically arbitrary order, and to dynamically distribute work packages of the plurality of data objects among the plurality of servers according to a process-specific execution order definable by means of the parallel processing framework.

In one embodiment of the computer system, the work packages may be distributed automatically according to a process-specific execution order predefined by a user. The work packages whose individual size can be influenced by the adapter unit according to rules given by the user with respect to a specific process may be dynamically distributed among the servers by additionally taking into account that the overall processor load of each server is well-balanced among the servers. The work package may include one or more blocks, each block having a specific size.

According to another embodiment of the computer system, each work package may be processed on a server via an asynchronous remote function call (aRFC). The number of parallel running subprocesses may depend on the configuration and the current load of the system. Normally, it can be significantly higher than the number of parallel jobs which have been distributed manually. If one job is started, processes (aRFCs) can be started, for example, up to the system limit.

Embodiments of the present invention also relate to computer implemented frameworks for dynamic parallel processing of a plurality of subprocesses of a process, each of the plurality of subprocesses including processing of one or more data objects in a computer system including a plurality of servers for processing the plurality of data objects by the plurality of subprocesses. The frameworks may define schemes for building work packages from the plurality of data objects, a scheme being specific for a process type. The frameworks may also define an execution order for dynamically distributing the work packages among the plurality of servers, an execution order being specific for a process type.

In one embodiment, the computer implemented framework may include a display for dynamically showing the status of the process during processing.

Furthermore, the computer implemented framework may define functional modules for substituting a process-specific scheme and a process-specific execution order when being executed.

Embodiments of the invention further relate to computer programs with program code stored on a computer-readable medium which is suitable for carrying out methods consistent with the invention when the computer program is run on a computer.

Further features and embodiments of the invention will become apparent from the description and the accompanying drawings.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute part of this specification, illustrate embodiments consistent with the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
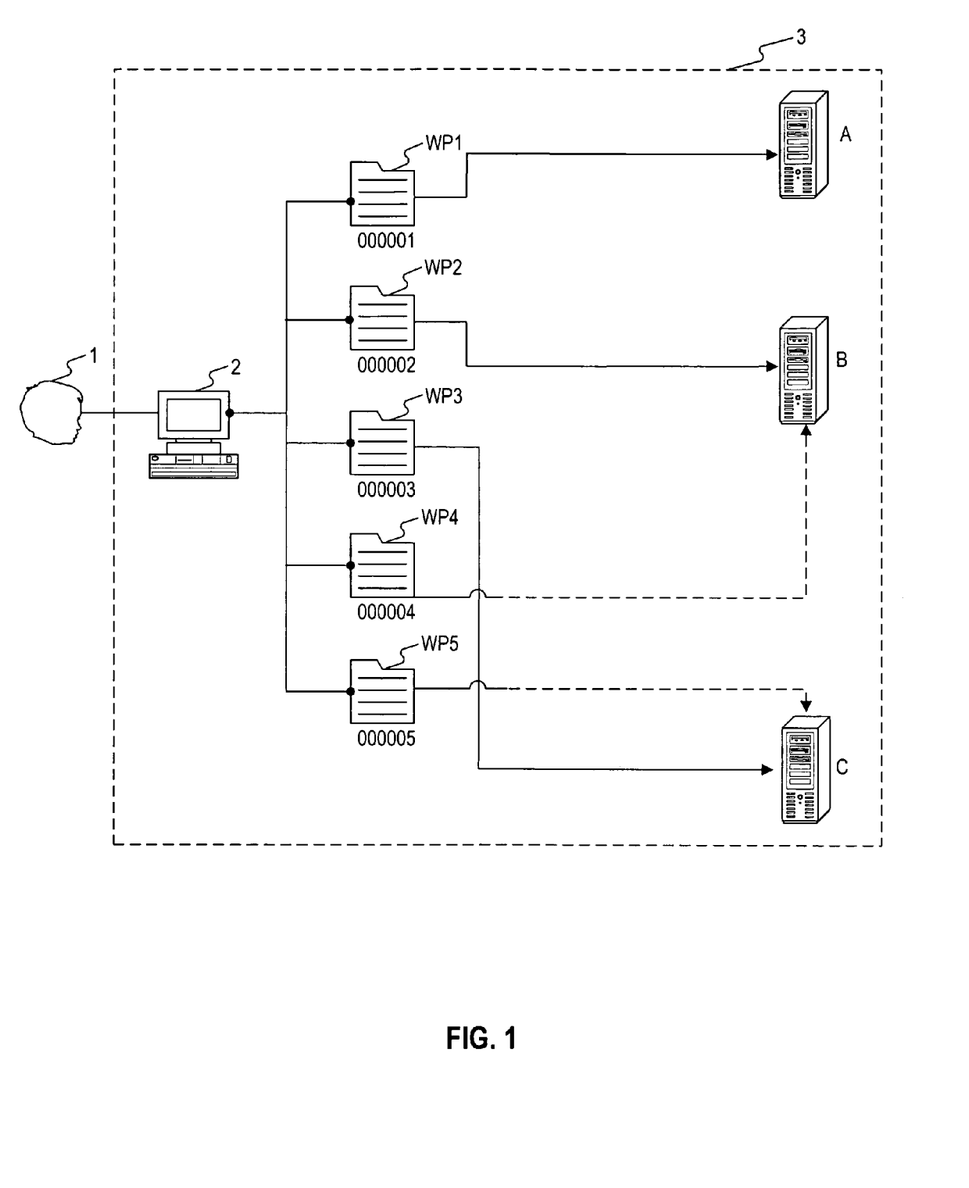
FIG. 1 is a schematic view, consistent with an embodiment of the invention, of an exemplary system for starting a process.

FIG. 1 is a schematic view, consistent with an embodiment of the invention, of an exemplary system for starting a process. As shown in FIG. 1, a user 1 may want to start a process via a computing unit 2. The computing unit 2 may be part of a computer system 3. The computer system 3 may include a plurality of servers or, as illustrated in this example, three servers A, B, and C. User 1 may start a process which has to be done using computer system 3. Processes may have to be done very quickly in times of low use of the computer system capacity, such as at night. Therefore, processes should be accelerated as much as possible so that they are completed before the load of computer system 3 rises again. For that reason, optimization of complex processes may increase system performance and availability. The process which is started by user 1 may include processing of a plurality of data objects.

In the example of FIG. 1, computing unit 2 may put a parallel processing framework at the user's disposal. This framework may provide user 1 with a logical structure for classifying and organizing process-specific components which can be determined and inserted by user 1 in appropriate data fields or tables to thus generate a process-specific scheme. The framework can contain specialized APIs (Application Program Interfaces), services and tools, which reduce the knowledge that user 1 needs to start the process. In one embodiment, the framework may be an outline or skeleton, within which details relating to the process to be executed can be added.

In a first step, an adapter unit (not shown) associated with computing unit 2 may generate, according to a process-specific scheme, five work packages WP1 to WP5 that are be based on the plurality of data objects. Each work package may have a certain size. The sum of the number of work packages multiplied by their respective size may result in the total workload. In a next step, the work packages WP1 to WP5 are distributed by the adapter unit among the available servers A, B and C. The execution order of the work packages can generally also be determined by user 1.

As further shown in the example of FIG. 1, WP1 may be sent to server A, WP2 may be sent to server B, and WP3 may be sent to server C. Once one of those distributed work packages WP1 to WP3 is finished, the next work package can be started at once. For example, as indicated by dotted lines, server B may be available after having processed the second work package WP2 and before server A has processed the first work package WP1. Server B may continue and immediately process the fourth work package WP4. The fifth work package WP5 may be processed by server C, because server A may not yet have finished with the first work package WP1. As a result of this dynamic distribution of the work packages, the processing can be optimized in time. Further, more than one work package can be sent to one server if enough resources are available at that server.

Figure 2:
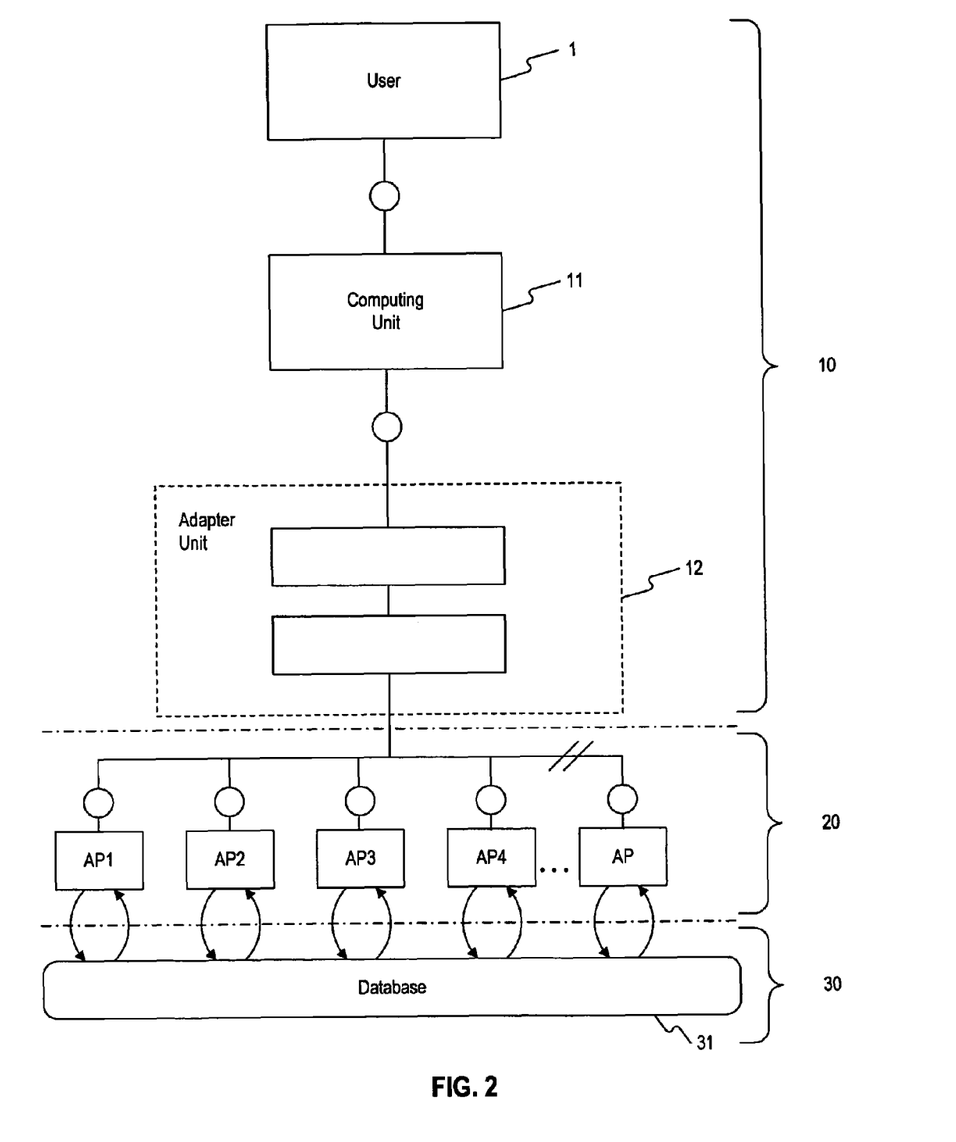
FIG. 2 illustrates a schematic view, consistent with an embodiment of the invention, of an exemplary configuration of a computing system.

FIG. 2 shows an exemplary structure of a computer system for dynamic parallel processing of a plurality of subprocesses of a process, each of the plurality of subprocesses including processing of one or more data objects. Control level 10 may include user 1, a computing unit 11 and an adapter unit 12.

In a second level 20 beneath the control level 10, a plurality of servers (e.g., server group) AP1 to APn may be arranged for processing. A third level 30 may include a database 31. Adapter unit 12 may interconnect computing unit 11 with the plurality of servers AP1 to APn. Computing unit 11 may provide a parallel processing framework with means to compose rules for building and for distributing work packages of the plurality of data objects, thus defining a process-specific scheme and a process-specific execution order, the parallel processing framework further providing a display for dynamically showing the status of the process during processing.

The adapter unit 12 may generate the work packages (WP generation) of the plurality of data objects which have to be processed by the plurality of subprocesses running in parallel. After having generated the appropriate work packages with respect to the process-specific scheme defined by using the framework, those work packages may be distributed (WP distribution) by the adapter unit 12 among the plurality of servers AP1 to APn. This distribution may be made in a dynamic manner, while the execution order of the work packages may be determined by the user with help of the framework. Adapter unit 12 may provide two functions. The first function may be to build the work packages and to set the order of the work packages for a certain process according to a user defined scheme. The second function may be to start, for every work package, an individual subprocess on any server of the plurality of servers AP1 to APn. Thus, there may be n subprocesses started in parallel.

Figure 3:
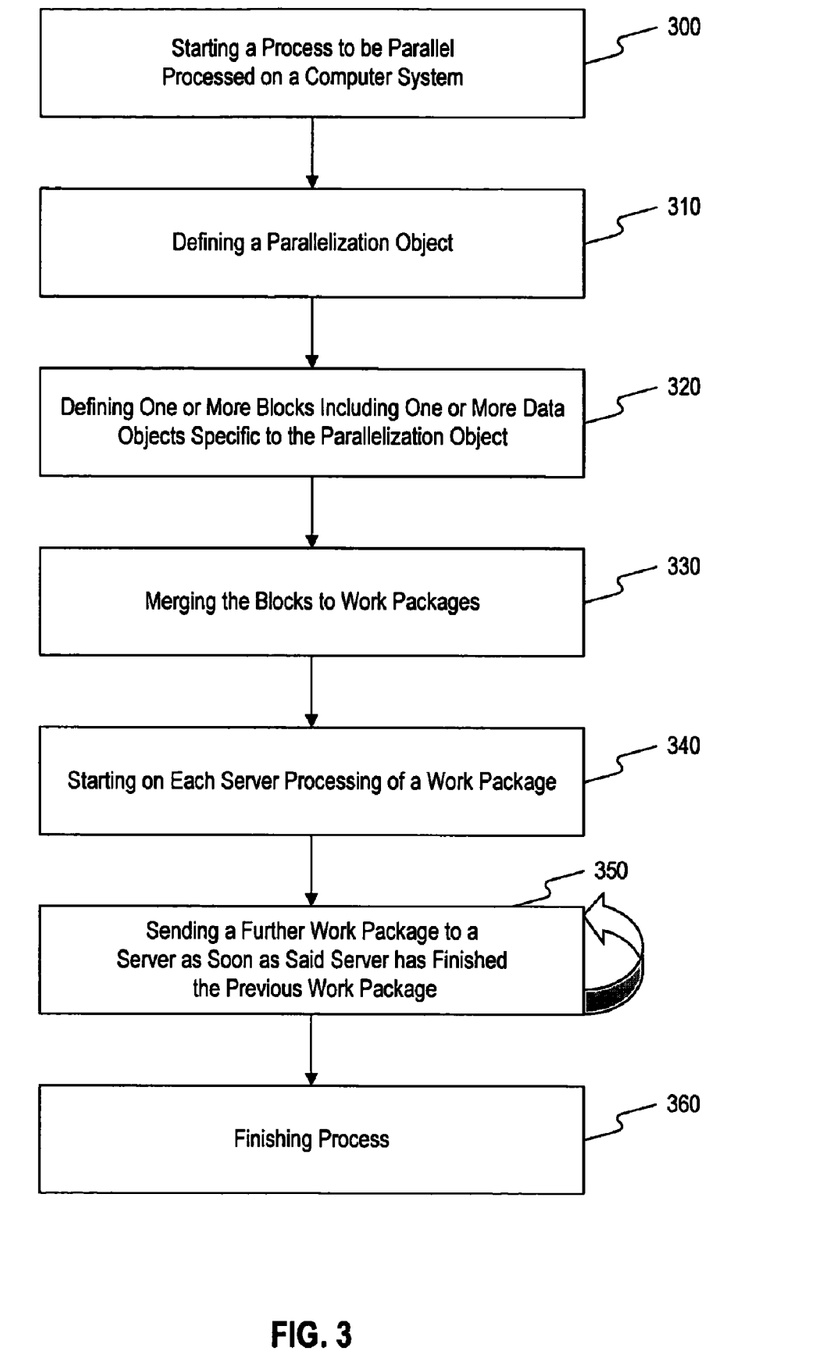
FIG. 3 illustrates a flowchart, consistent with an embodiment of the invention, of an exemplary method for dynamic parallel processing.

FIG. 3 illustrates a flowchart, consistent with an embodiment of the present invention, of an exemplary method for dynamic parallel processing. In step 300, user 1 may start a process which includes processing of a plurality of data objects on a computer system. Computer system 3 may include a plurality of servers (cf. FIG. 1), each including at least one processor, and an adapter unit 12. Computer system 3 may further provide a parallel processing framework which may include a structured collection of all components which relate to and apply to the process. User 1 may fix the different required components, thus defining process-specific parameters. The process may be processed using the process-specific parameters within best time.

In step 310, the process may be analyzed by adapter unit 12. Adapter unit 12 may define a parallelization object. For example, a commission process may parallelize objects that correspond to commission contracts.

In step 320, one or more blocks may be defined. Each block may comprise one or more data objects specific to the parallelization object.

In step 330, several blocks may be merged to one work package. The generating of the blocks and the succeeding creation of work packages may be performed with respect to the predefined process-specific parameters as determined by the user using the parallel processing framework. For example, commission contracts with equal or similar conditions or properties can be combined to one block or at least within one work package. Therefore, a rough order of the work packages may be established.

In step 340, adapter unit 12 may start, on each server, the processing of a work package as a job. As soon as one of the plurality of servers has finished a work package, which can be indicated, for example, by a COMMIT, a further work package may be sent to that server as (step 350). This procedure may continue until all work packages are processed by any one of the plurality of servers as indicated by a backward arrow. Therefore, the complete workload, consisting of the generated plurality of work packages, may be distributed dynamically to several sub-processes. The processing of the work packages on different servers can be done in a semantically arbitrary order which may be ensured by the predefined process-specific parameters. A process-specific order may already be taken into account when generating the blocks and the work packages (step 320 and step 330). When all work packages are processed, the process is finished (step 360).

Figure 4:
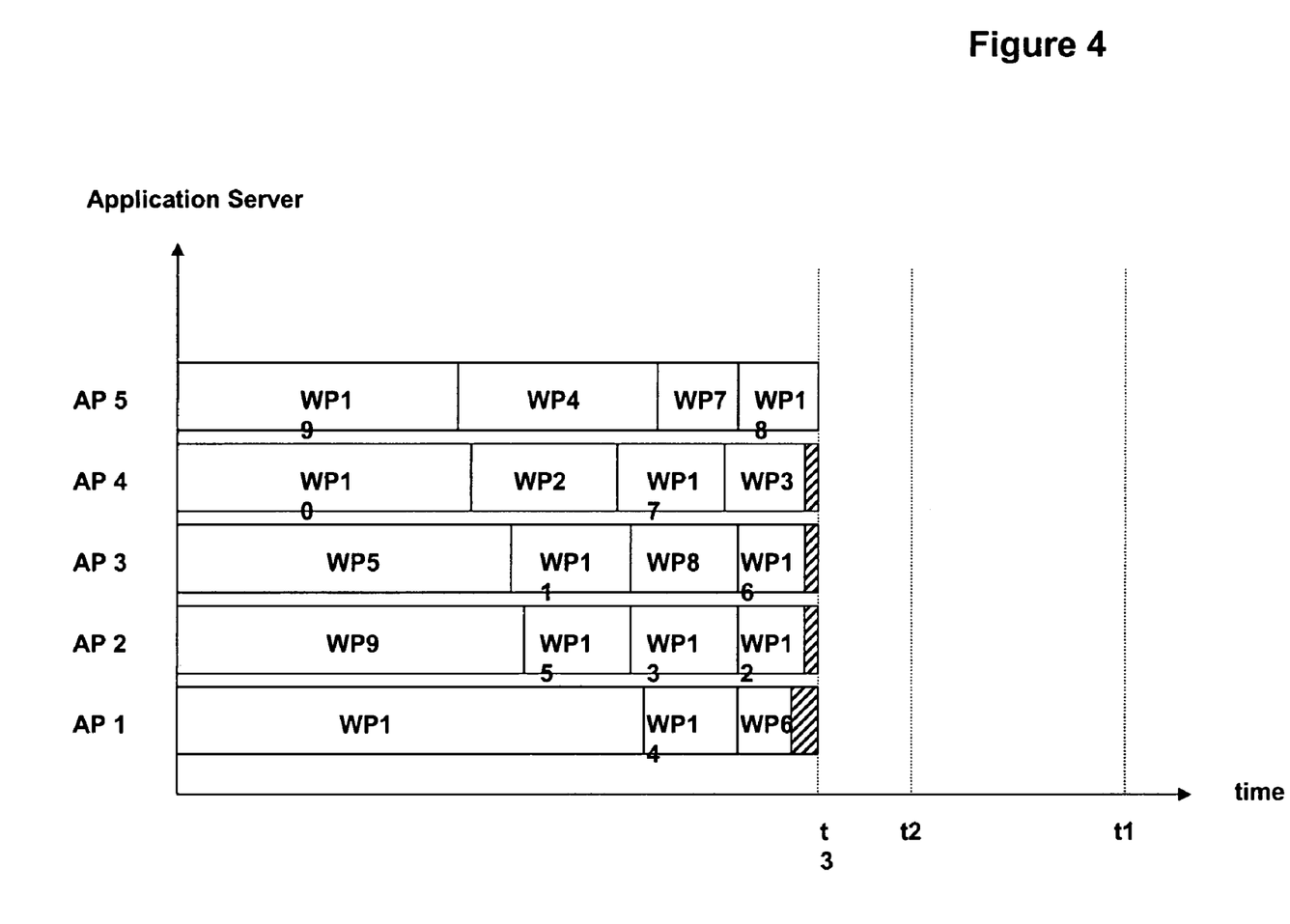
FIG. 4 illustrates an exemplary diagram, consistent with an embodiment of the present invention, of an exemplary distribution of work packages among a number of servers.

FIG. 4 depicts an exemplary distribution of work packages WP among a number of servers. This distribution may be optimized. In the example shown, five application servers AP1 to AP5 are available, and 19 work packages are generated. However, the same procedure described in the following also applies to any number of work packages and any number of servers.

From the 19 work packages WP1 to WP19, adapter unit 12 may choose, according to the size of the work packages, the largest five WPs to be sent to the APs, i.e., WP1, WP9, WP5, WP1 and WP19 (in descending order). The smallest WP among these five WPs, namely WP19, which is processed by AP5, may be finished first. Then the next WP in size, namely WP4, may be sent to AP5. From FIG. 4 it is understood that the minimal possible computing time of the longest subprocess which can be achieved corresponds to the computing time for the largest WP in case that after finishing the largest work package no further work packages would be left for computation. However, in the present example, after AP1 has finished WP1, there are still work packages left for computation and WP14 may be sent to AP1. Finally, the last five WPs may be sent to the APs, and one after the other, as an AP finishes a WP. The process may end with the last AP (AP5) finishing WP18 defining the process time t3.

The time of the other APs being idle due to the waiting for AP5 finishing WP18 may be minimized. This minimization may be achieved by ordering the WPs according to descending size and sending them dynamically to the available servers. The dotted lines on the right show the process time if this minimization would not be performed: t1 would be the process time if the WP would be sent just by increasing index number, i.e., WP1, WP2, WP3, WP4 to AP1, WP5, WP6, WP7, WP8 to AP2, and so on. Time t2 would be the process time if the WPs are dynamically distributed on the APs without changing the order of the index, i.e., an AP gets the next WP in the index list as soon as that AP has finished one: WP1 to AP1, WP2 to AP2, WP3 to AP3, WP4 to AP4, WP5 to AP5, WP6 to the first of the APs which has finished his first WP, WP7 to the second APs which has finished his first WP, and so on.

Referring again to the example of accounting commission contracts as a process to be executed, a display may be generated by the parallel processing framework that depicts the segmentation of the workload using a table, such as that shown in Table 1 below. The overall workload may correspond to the entirety of the commission contracts. A user wishing to start the process of accounting the commission contracts may insert appropriate data into the table. In the first column of Table 1, an identification number of a work package to be built may be inserted. In second and third columns, an interval of commission contracts which should be merged in one work package can be determined. The second column contains the registration number of the contract forming the lower interval limit, and the third column shows the registration number of the contract forming the upper limit of the respective interval. Contracts including a registration number within the interval from 1 to 10000 may be merged within work package 1, while the contracts including a registration number within the interval from 10001 to 11000 may be combined within work package 2.

TABLE 1

An example for a workload segmentation into work packages for the process regarding accounting commission contracts with respect to the contract registration number.

| Work package | Lower contract registration number | Upper contract registration number |
| --- | --- | --- |
| 1 | 1 | 10000 |
| 2 | 10001 | 11000 |
| ... | ... | ... |

Alternatively, in one embodiment consistent with the invention, the framework may provide a table that allows the workload to be segmented based on the identity of different customers (see, e.g., Table II below), including the use of generally known wildcards. Therefore, a user wishing to start the process can insert appropriate data within corresponding data fields or table columns, respectively.

In the example shown by Table II, the user may define that a work package should include all contracts relating to one customer. Therefore, work package 1 may be built by merging all contracts relating to customer A, work package 2 will include all contracts relating to customer W, and so on. In work package 5 contracts of customers, the identity of which starts with strings from "CA" to "CO," may be selected, thereby applying alphabetic order rules. Accordingly, in work package 6, contracts of customers may be selected, the identity of which starts with a string from "E" to "G".

TABLE II

Example for workload segmentation into work packages for the process regarding accounting contracts with respect to the names of the customers.

| Work package | Starting identity of customer | Ending identity of customer |
|---|---|---|
| 1 | A | A |
| 2 | W | W |
| 3 | B | B |
| 4 | XY-Company | XY-Company |
| 5 | CA* | CO* |
| 6 | E* | G* |
| ... | ... | ... |

As seen from Tables I and II, the segmentation of any workload into work packages can differ regarding the character of the process. The segmentation may be defined by the user. The order of the execution of the work packages may depend on the order defined in rules which may be given by the user.

Modifications and adaptations of the present invention will be apparent to those skilled in the art from consideration of the specification and practice of the embodiments and features disclosed herein. The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the described implementation includes software, but systems and methods consistent with the present invention may be implemented as any combination of hardware and software or in hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and charts of embodiments of the invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Other embodiments of the invention will be apparent to those skilled in the art from consideration of the specification and practice of embodiments and features of the invention disclosed therein. It is intended, therefore, that the specification and embodiments be considered as exemplary only, with a true scope and spirit of the invention being indicated by the following claims.

What is claimed:

1. A computer-implemented method comprising:
performing dynamic parallel processing of a plurality of subprocesses of a process initiated by a parallel processing framework, each of the plurality of subprocesses including processing of one or more data objects in a computer system comprising a plurality of servers for processing the plurality of data objects by the plurality of subprocesses;
building, by using a processor of the computer system, work packages from the plurality of data objects according to a process-specific scheme and by using a wildcard to associate a range of the data objects to one of the work packages, wherein a size of one of the work packages is chosen based on a predefined granularity, the predefined granularity causing all available servers from the plurality of servers to execute at least one work package during runtime when the work packages are procurable;
setting a process specific execution order of the work packages, the work packages including a first work package and a second work package;
dynamically distributing the work packages among the plurality of servers according to the process-specific execution order, the plurality of servers including a first server and a second server, wherein processing of the work packages is performed by the plurality of servers in a semantically arbitrary order based on predefined process-specific parameters; and
generating a graphical display indicating that the first work package is assigned to the first server and that the second work package is assigned to the second server, wherein the graphical display includes a name of the first work package, a name of the second package, a name of the first server, a name of the second server, and a status indicating that the first work package is currently being processed by the first server.

2. The method according to claim 1, wherein the scheme is defined by the framework, such that the work packages can be executed in the semantically arbitrary order.

3. The method according to claim 1, wherein the execution order is defined by the framework.

4. The method according to claim 1, wherein the process-specific scheme accounts for blocking rules relating to the plurality of data objects, the blockings being activated at a beginning of the corresponding process.

5. The method according to claim 1, further comprising:
composing rules for building and rules for distributing the work packages; and
defining the process-specific scheme and the process-specific execution order, wherein the parallel processing framework provides a display for dynamically showing a status of the process during processing.

6. The method according to claim 1, wherein each work package is built up of one or more blocks, each block having a specific size.

7. The method according to claim 1, wherein the work packages are distributed among the plurality of servers.

8. The method according to claim 1, wherein the work packages are commit controlled.

9. The method according to claim 1, wherein each work package is processed on a server via an asynchronous remote function call.

10. The method according to claim 1, wherein each work package is processed according to the predefined granularity.

11. The method according to claim 1, wherein the process-specific scheme to build the work packages and the process-specific execution order of the work packages are substituted by functional modules to be executed.

12. A computer system for dynamic parallel processing of a plurality of subprocesses of a process, the plurality of subprocesses including processing of one or more data objects, comprising:

a computing unit providing a parallel processing framework, each of the plurality of subprocesses including processing of one or more data objects;

a plurality of servers for processing the plurality of data objects by the plurality of subprocesses; and an adapter unit interconnecting the computing unit and the plurality of servers, the adapter unit being arranged and constructed to:

automatically build work packages of the plurality of data objects based on predefinable rules and by using a wildcard to associate a range of the data objects to one of the work packages, wherein a size of one of the work packages is chosen based on a predefined granularity, the predefined granularity causing all available servers from the plurality of servers to execute at least one work package during runtime when the work packages are procurable;

set a process specific execution order of the work packages, the work packages including a first work package and a second work package;

dynamically distribute the work packages of the plurality of data objects among the plurality of servers according to the process-specific execution order, the plurality of servers including a first server and a second server, wherein processing of the work packages is performed by the plurality of servers in a semantically arbitrary order based on predefined process-specific parameters; and generate a graphical display indicating that the first work package is assigned to the first server and that the second work package is assigned to the second server, wherein the graphical display includes a name of the first work package, a name of the second package, a name of the first server, a name of the second server, and a status indicating that the first work package is currently being processed by the first server.

13. The computer system according to claim 12, wherein the rules are predefinable by the parallel processing framework, such that the work packages can be executed in the semantically arbitrary order.

14. The computer system according to claim 12, wherein the process-specific execution order can be defined by the parallel processing framework.

15. The computer system according to claim 12, wherein the adapter unit is chosen as a process-specific adapter unit.

16. The computer system according to claim 12, wherein the work packages can be distributed automatically according to a process-specific execution order predefined by the parallel processing framework.

17. The computer system according to claim 12, wherein each work package comprises one or more blocks, each block having a specific size.

18. The computer system according to claim 12, wherein the work packages can be commit controlled.

19. The computer system according to claim 18, wherein one or more of the work packages are divided into one or more commit blocks.

20. The computer system according to claim 12, wherein each work package can be processed on a server via an asynchronous remote function call.

21. A non-transitory computer readable storage medium comprising program code instructions which, when executed on a processor, causes the processor to perform a method, the method being executed by the processor comprising:

performing dynamic parallel processing of a plurality of subprocesses of a process initiated by a parallel processing framework, the plurality of subprocesses including processing of one or more data objects in a computer system comprising a plurality of servers for processing the plurality of data objects by the plurality of subprocesses;

building work packages from the plurality of data objects according to a process-specific scheme and by using a wildcard to associate a range of the data objects to one of the work packages, wherein a size of one of the work packages is chosen based on a predefined granularity, the predefined granularity causing all available servers from the plurality of servers to execute at least one work package during runtime when the work packages are procurable;

setting a process specific execution order of the work packages, the work packages including a first work package and a second work package;

dynamically distributing the work packages among the plurality of servers according to the process-specific execution order, the plurality of servers including a first server and a second server, wherein processing of the work packages is performed by the plurality of servers in a semantically arbitrary order based on predefined process-specific parameters; and generating a graphical display indicating that the first work package is assigned to the first server and that the second work package is assigned to the second server, wherein the graphical display includes a name of the first work package, a name of the second package, a name of the first server, a name of the second server, and a status indicating that the first work package is currently being processed by the first server.

22. The non-transitory computer readable storage medium according to claim 21, wherein the program code comprises a computer implemented framework.

23. The non-transitory computer readable storage medium according to claim 22, further comprising a display for dynamically showing a status of the process during processing.

24. The non-transitory computer readable storage medium according to claim 22, further comprising means for defining functional modules substituting a process-specific scheme and a process-specific execution order when being executed.

* * * * *